United States Patent
Solgi

(10) Patent No.: US 11,348,010 B1
(45) Date of Patent: May 31, 2022

(54) GENETIC ALGORITHM-BASED ENCODING OF NEURAL NETWORKS

(71) Applicant: Mohammad Solgi, Santa Barbara, CA (US)

(72) Inventor: Mohammad Solgi, Santa Barbara, CA (US)

( * ) Notice: Subject to any disclaimer, the term of this patent is extended or adjusted under 35 U.S.C. 154(b) by 0 days.

(21) Appl. No.: 17/330,349

(22) Filed: May 25, 2021

(51) Int. Cl.
*G06N 3/08* (2006.01)
*G06N 3/063* (2006.01)
*G06F 7/58* (2006.01)

(52) U.S. Cl.
CPC ............ *G06N 3/086* (2013.01); *G06F 7/58* (2013.01); *G06N 3/063* (2013.01)

(58) Field of Classification Search
CPC .......... G06N 3/086; G06N 3/063; G06F 7/58; H03M 1/20
See application file for complete search history.

(56) References Cited

PUBLICATIONS

Huang, Junhao, Weize Sun, and Lei Huang. "Deep neural networks compression learning based on multiobjective evolutionary algorithms." Neurocomputing 378 (2020): 260-269. (Year: 2020).*

Yang, Zhaohui, et al. "Searching for low-bit weights in quantized neural networks." arXiv preprint arXiv:2009.08695 (2020). (Year: 2020).*

Mishra, Rahul, Hari Prabhat Gupta, and Tanima Dutta. "A survey on deep neural network compression: Challenges, overview, and solutions." arXiv preprint arXiv:2010.03954 (2020). (Year: 2020).*

Nogami, Wakana, et al. "Optimizing weight value quantization for cnn inference." 2019 International Joint Conference on Neural Networks (IJCNN). IEEE, 2019. (Year: 2019).*

Özkaynak, Fatih. "Cryptographically secure random number generator with chaotic additional input." Nonlinear Dynamics 78.3 (2014): 2015-2020. (Year: 2014).*

Ding, Shifei, et al. "Studies on Optimization Algorithms for Some Artificial Neural Networks Based on Genetic Algorithm (GA)." Journal of Computers 6.5 (2011): 939. (Year: 2011).*

Matsumoto, Makoto, and Takuji Nishimura. "Mersenne twister: a 623-dimensionally equidistributed uniform pseudo-random number generator." ACM Transactions on Modeling and Computer Simulation (TOMACS) 8.1 (1998): 3-30. (Year: 1998).*

* cited by examiner

*Primary Examiner* — Benjamin P Geib

(57) ABSTRACT

Methods and systems are disclosed to reduce the memory requirement of neural networks by encoding the coefficients of a neural network during training stage and decoding them during the inference. The disclosed embodiment consists of a neural network coefficient decoder (NNCD), a genetic algorithm-based encoding system (GAbES), a coefficient encoding method (CEM), and a genetic algorithm-based neural network coefficient encoding/decoding (GANCED) system. The design is consistent with both hardware and firmware and it can be implemented by bitwise operation as a hardware accelerator or easily computed by a traditional processing unit. The disclosed embodiment reduces the memory storage requirement of hardware implementation of neural networks. This reduction speeds up the processing of neural networks and reduces the dynamic power consumption of the circuit.

12 Claims, 8 Drawing Sheets

GENETIC ALGORITHM-BASED ENCODING OF NEURAL NETWORKS

GENETIC ALGORITHM-BASED ENCODING OF NEURAL NETWORKS

GENETIC ALGORITHM-BASED ENCODING OF NEURAL NETWORKS

GENETIC ALGORITHM-BASED ENCODING OF NEURAL NETWORKS

GENETIC ALGORITHM-BASED ENCODING OF NEURAL NETWORKS

GENETIC ALGORITHM-BASED ENCODING OF NEURAL NETWORKS

TECHNICAL FIELD

The present disclosure generally relates to the field of artificial intelligence (AI) accelerators and machine learning (ML) and particularly to a system which reduces memory requirements of neural networks.

BACKGROUND

Neural networks are widely applied in the field of machine learning (ML) and artificial intelligence (AI). Neural networks usually consist of several layers. Each layer of a neural network consists of one or more cells (also called unit or neuron). Each cell's output ($y_{i,j}$ in equation (1)) is a function of the inputs to the cell as follows:

$$y_{i,j} = f(\Sigma_l [W_{i,j,l} \times x_{i,j,l}] + bias_{i,j}) \quad (1)$$

in which, $y_{i,j}$=the output of cell i of the layer j, $W_{i,j,l}$=the weight of input l of cell i of layer j, $bias_{i,j}$=the bias of cell i of layer j, and $f(.)$=an activation function (i.e., sigmoid function).

Hardware implementation of inference neural networks on a device requires receiving a set of inputs and reading a set of coefficients from the memory to calculate the outputs. As the number of cells or layers of a neural network increases (i.e., deep neural networks) the number of the weights and biases ($W_{i,j,l}$ and $bias_{i,j}$) increases, which demands a large memory to store them. The storage of the coefficients increases system memory area and power, and the uploading cycles increase the dynamic power consumption of the system. For instance, in a system-on-chip (SoC) with a finite system memory and processing capacity, a deep neural network is processed in batches, which require frequent uploading of the coefficients that increases the dynamic power consumption, slows down processing an inference neural network, and reduces the system's throughputs. Therefore, techniques are required to reduce the necessary memory and uploading cycles.

SUMMARY

Novel methods and systems are disclosed to reduce the memory storage of neural networks by encoding the optimized coefficients of a trained neural network including weights and biases into a smaller number of encoded parameters and decoding them during the inference neural network. The present embodiment eliminates the need for saving the original optimized coefficients in the memory. Instead, the encoded parameters, which occupy less memory than the original optimized coefficients, are saved. The disclosed embodiment is comprised of a neural network coefficient decoder (NNCD), a genetic algorithm-based encoding system (GAbES), a coefficient encoding method (CEM), and a genetic algorithm-based neural network encoding/decoding (GANCED) system.

The encoding and decoding procedures of the disclosed embodiment both utilize the neural network coefficient decoder (NNCD). The NNCD of the disclosed embodiment comprises of (1) a feedback loop unit and (2) a pseudo random number generator. The pseudo random number generator is seeded by the feedback loop unit repeatedly for several cycles. The feedback loop unit's output (the seed of the pseudo random number generator) of the disclosed embodiment is designed to be a function of some parameters received as the input by the NNCD and the previous output of the pseudo random number generator. Therefore, given some input parameters, the NNCD of the present embodiment is capable of producing a greater number of outputs due to its feedback loop. Also, the outputs of the disclosed NNCD are pseudo independent numbers because they are produced by a pseudo random number generator. Therefore, by choosing the input parameters of the NNCD such that the outputs of the NNCD are good estimations of the optimized coefficients of a neural network, the enclosed embodiment eliminates the need for storing the original optimized coefficients. Instead, it is enough to store the parameters of the NNCD. One of the features of the disclosed embodiment that distinguishes it from the prior art is that since the outputs of the NNCD are pseudo independent, the neural network coefficients can be encoded to some smaller number of parameters regardless of their dependency. In other words, the disclosed embodiment allows a sequence of N independent (orthogonal) or dependent real numbers be estimated using R parameters where R<N with an acceptable accuracy.

To choose the right values for parameters of the NNCD which generates the desired outputs, the disclosed embodiment applies an optimization model which minimizes a measure of the error between the outputs of the NNCD and the optimized coefficients of the neural network with respect to the parameters of the NNCD. The genetic algorithm-based encoding system (GAbES) of the present embodiment applies an evolutionary algorithm so called genetic algorithm to solve the aforementioned optimization model and hence conducts the task of encoding by finding the correct values of the input parameters of the NNCD which provides high accuracy estimations of the optimized coefficients. Accordingly, the disclosed GAbES comprises of (1) a set of encoding engines each utilizes a genetic algorithm to map independent, original real numbers into a smaller number of encoded parameters and (2) a central unit which receives said sequence of the original, real numbers, distributes the task of the encoding among the encoding engines, collects the encoded parameters from the encoding engines, and outputs the decoded parameters.

The coefficient encoding method (CEM) of the present embodiment conducts repetitive encoding and decoding tasks with retraining of the neural network to improve the accuracy of the encoding. Since application of the estimated coefficients instead of the original optimized coefficients introduces some minor error to the inference neural network, the CEM of the disclosed embodiment iteratively applies the GAbES to partially encode the coefficients of one or more layers of the neural network and conducts retraining of the rest of the coefficients which were not yet encoded while considering the encoded coefficients non-trainable and equal to their estimated values. Also, the GAbES and the NNCD works with numbers in a preset range. Hence the CEM of the present embodiment also scales the original optimized coefficients to be in the preset range of the GAbES and rescales the outputs of the NNCD to the original range of the optimized coefficients to be appropriate for the inference neural network. Accordingly, the disclosed CEM comprises of (1) an initial training of a neural network, (2) selecting some of the optimized coefficients for encoding, (3) scaling the selected coefficients into a range acceptable by the GAbES if necessary, (4) encoding the selected optimized coefficients into a shorter length sequence of parameters applying the GAbES, (5) simulating the NNCD to predict the estimations of the scaled encoded coefficients, (6) rescaling the estimations of the encoded coefficients if necessary, (7) retraining the neural network for the rest of the coefficients which have not yet been encoded considering the already encoded coefficients as non-trainable constants equal to their estimated values, (8) checking if there is any coefficients remained to be encoded, and (9) storing the encoded parameters in a memory.

One advantage of the disclosed embodiment is that the NNCD design is totally hardware friendly and all of the relevant operations can be done by bitwise operations like bitwise AND, bitwise inclusive OR, and bitwise exclusive OR (XOR), which facilities incorporating one or more NNCD in an AI accelerator with little or no overhead. Hence, the genetic algorithm-based neural network encoding/decoding (GANCED) of the disclosed embodiment is a system for speeding up the neural network coefficient encoding and decoding tasks applying actual NNCD circuits which replaces the simulation of the NNCD in the firmware (i.e., using a central processing unit, CPU). Accordingly, the disclosed GANCED comprises of (1) an input/output unit, (2) a processor block which comprises of one or several processors, (3) a memory block, and (4) a neural network coefficient decoder block (NNCD block) comprises of one or several NNCDs. The required data, information and flow controls are received by the input/output unit of the GANCED. The processor block of the GANCED performs the computation and data processing operations required for running and training neural networks, reading and writing the memory, running a genetic algorithm, scaling, and any other operations required for the present embodiment to work correctly. In fact, the GANCED conducts the steps of the CEM while the processor block is responsible for all the tasks but simulating the NNCD. Instead, the NNCD block are utilized for the decoding task which allows parallel computation and helps speeding up the process.

The present embodiment does not rely on any relation between the coefficients. This feature distinguishes the disclosed embodiment from the prior arts. There are different methods devised to reduce the memory usage of neural networks. A recent non-patent publication studied the prior art methods including compression through quantization, network pruning, designing structural matrix, and tensor decomposition. Cheng, Y, Wang, D., Zhou, P., and Zhang, T, "a survey of model compression and acceleration for deep neural networks.", IEEE Signal Processing Magazine, Special Issue on Deep Learning for Image Understanding, 2020, pp. 1-10. One prior art method is to compress the coefficients before their storage, yet as the size of a network increases the compression complexity and circuit size increases, which may tradeoff the benefits. Tensorized network is another method. In this method, the coefficients of a neural network are represented as an N-way tensor and then decomposed using CANDECOMP/PARAFAC factorization, tucker decomposition, or tensor train (TT) decomposition or other variations. Tensor factorization is mainly useful for over-parametrized neural networks or, where there are dependencies between the coefficients that can be eliminated through factorization. Designing structural matrix is another technique, but its constraints may negatively affect the accuracy since it introduces bias to the network. In addition, finding an appropriate structural matrix is difficult. Network pruning is another technique in which the connections whose weights are close to zero are removed from the network. Most of the prior art methods use the dependencies of the coefficients or take advantage of other commonalities among coefficients like classifying, averaging, etc. In contrast, this discloser does not rely on any relation between coefficients, which distinguish the present embodiment from the prior arts. Furthermore, the disclosed embodiment may be applied in conjunction with one or some other dimensionality reduction or compression techniques, where applicable.

BRIEF DESCRIPTION OF THE DRAWINGS

The features and advantages of the present embodiment will be better understood by reference to the following detailed description of the disclosed embodiment when considered in connection with the accompanying drawings wherein.

DETAILED DESCRIPTION

Figure 1:
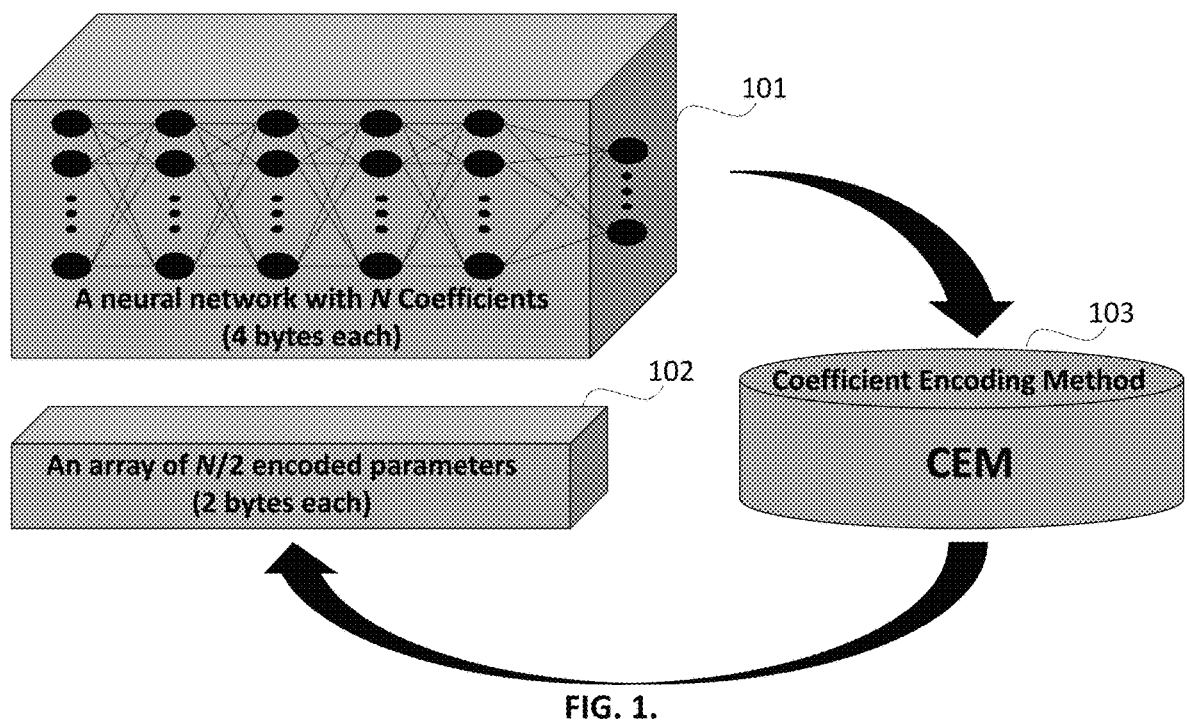
FIG. 1 illustrates the diagram of an exemplary implementation of the coefficient encoding method (CEM).
Figure 2:
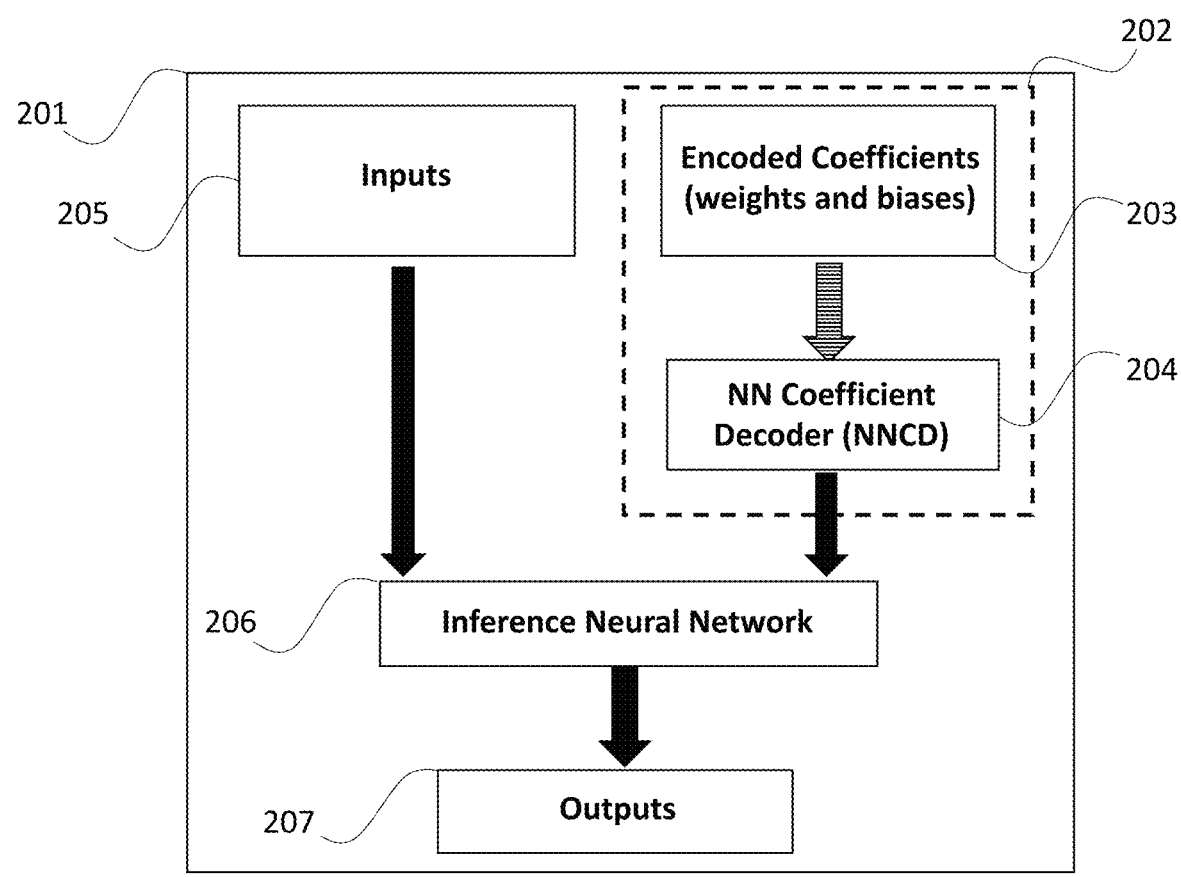
FIG. 2 is a block diagram of an exemplary machine learning system utilizing the disclosed neural network coefficient decoder (NNCD) during an inference neural network.

Referring to the drawings, FIG. 1 illustrates a block diagram of one exemplary implementation of the coefficient encoding method (CEM) 103 of the disclosed embodiment which encode a neural network with N coefficients of 4 bytes (32 bits) each 101 to an array of N/2 encoded parameters of 2 bytes (16 bits) each 102. It is noteworthy that not only the CEM 103 of the disclosed embodiment reduces the number of required elements to half, but also it reduces the number of required bytes by half, hence it achieves up to 75 percent reduction in the required memory size. Once the coefficients are encoded the inference neural network 206 is modified, as in FIG. 2 to utilize the neural network coefficient decoder (NNCD) 204 which receives the encoded coefficients 203 as its inputs and outputs the estimations of the original optimized coefficients which are passed to the inference neural network 206 to calculate the outputs 207 of the neural network 201 using the inputs 205 of the network 201. The outputs 207 of the network can be a prediction, a classification, or others depending on the task and the inputs 205 of the network 201.

The CEM utilizes the NNCD and genetic algorithm-based encoding system (GAbES). So, in the following, the NNCD and GAbES are first described by an example and finally the steps of the CEM are presented in detail. The GANCED which utilizes the CEM and the NNCD during training and running neural networks is described at the end.

The neural network coefficient decoder (NNCD) of the present embodiment generates a sequence of pseudo independent numbers from a given smaller sequence of input parameters. The NNCD comprises of a pseudo random number generator and a feedback loop unit. The feedback loop unit seeds the pseudo random number generator repeatedly where the feedback loop unit's output is a function of the input parameters received by the disclosed NNCD and the previous output of the pseudo random number generator. The pseudo random number generator produces one number for every given seed but the cyclic application of the feedback loop unit seeding the random number generator makes the NNCD to be able to generate a greater number of outputs than the given input parameters.

Figure 3:
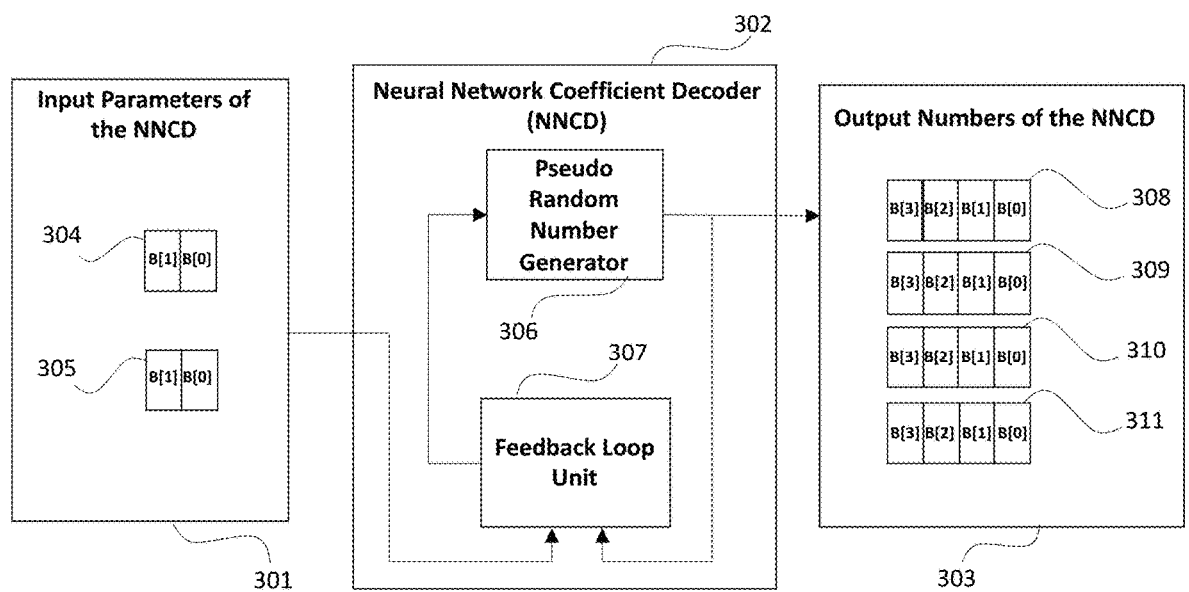
FIG. 3 illustrates an exemplary implementation of the neural network coefficient decoder (NNCD) and its inputs and outputs.

FIG. 3 depicts one example of the NNCD 302 of the present embodiment, which receives two input parameters (2 bytes each) 304 and 305, and regenerates estimations of four numbers (4 bytes each) 303 where the pseudo random number generator 306 of the NNCD 302 is seeded four times by the feedback loop unit 307 in order to generate four numbers $\hat{C}_1$ 308, $\hat{C}_2$ 309, $\hat{C}_3$ 310, and $\hat{C}_4$ 311 as follows:

$$\hat{C}_n = \Psi(I_n), n=\{1,2,3,4\} \quad (2)$$

in which $\Psi$ is a pseudo random number generator 306 which receives $I_n$, its seed at time n. $I_n$ is calculated using two encoded parameters $\theta_1$ 304 and $\theta_2$ 305 in a feedback loop calculated by equation (10) and equation (11).

One example of a pseudo random number generator is the Mersenne Twister algorithm introduced by Matsumoto, M and Nishimura, T "Mersenne twister: a 623-*dimensionally equidistributed uniform pseudo-random number generator.*" *ACM Transactions on Modeling and Computer Simulation*, vol. 8 (1), 1998, pp. 3-30. Mersenne Twister is widely used in different domains like cryptography, gaming, programming languages among others for generating pseudo random numbers. As a background knowledge, a 32-bit Mersenne Twister is given as follows:

$$u_0 = (I \& U_{mask} | p_1 \& L_{mask}) \quad (3)$$

$$u_1 = \begin{cases} u_0 \gg 1 & \text{if } u_0[0] = 0 \\ (u_0 \gg 1) \oplus a & \text{if } u_0[0] = 1 \end{cases} \quad (4)$$

$$u_2 = p_2 \oplus u_1 \quad (5)$$

$$u_3 = u_2 \oplus (u_2 \gg h) \quad (6)$$

$$u_4 = u_3 \oplus ((u_3 \ll s) \& d) \quad (7)$$

$$u_5 = u_4 \oplus ((u_4 \ll t) \& c) \quad (8)$$

$$Z = u_5 \oplus (u_5 \gg r) \quad (9)$$

in which I=a 4-byte initial seed, $U_{mask}$=0x80000000, $L_{mask}$ 0x7FFFFFFF, a=0x9908B0DF, $p_1$ and $p_2$ are non-zero values (32 bits each), h=11, s=7, t=15, r=18, d=0x9D2C5680, c=0xEFC60000, $u_0[0]$=the least significant bit of $u_0$ which is either zero or one, and operators $\gg$, $\ll$, &, |, and $\oplus$ denotes shift right, shift left, bitwise AND, bitwise inclusive OR, and, bitwise exclusive OR (XOR), respectively. The applied number generator receives a 4-byte binary seed (I) and generates a 4-byte binary number (Z) as output.

Mersenne Twister is adopted here as a reliable method to generate pseudo random numbers, which is non-repeating. Hence, one novelty of this work is how the feedback loop unit is dynamically modified and seeds the Mersenne Twister algorithm. The seed generated by the feedback loop unit of one exemplary system of the disclosed NNCD is as follows:

$$I_n = P(\theta_1, \theta_2, \hat{C}_{n-1}) \& w, n=\{1,2,3,4\} \quad (10)$$

$$P(\theta_1, \theta_2, \hat{C}_{n-1}) = (\theta_1^{(1-\delta)} \times (\theta_2 \times \hat{C}_{n-1})^\delta) \bmod 2^{16}, n=\{1,2,3,4\} \quad (11)$$

where $\hat{C}_0=1$ and $\delta$ is a binary parameter whose value switches for different values of n, and w=0x0000FFFF is used to assign a 2-byte number generated by $P(\theta_1, \theta_2, \hat{C}_{n-1})$ to the least significant half of the seed of the 4-byte number generator (the applied Mersenne Twister algorithm) where the most significant half of the seed is zero.

Using equation (10) the seed of the number generator 306 is related to the encoded coefficients ($\Theta=(\theta_1, \theta_2)$) 301 and the previous output of the number generator in a feedback loop 307. In order to generate each batch of four numbers (4 bytes each) 303, two parameters ($\theta_1$ and $\theta_2$, 2 bytes each $\Theta=(\theta_1, \theta_2)$) 304 and 305, must be read from the memory. After each batch of numbers 303 is calculated, the associated $\Theta$ 301 is no longer needed and can be deleted or overwritten by a new set. The role of the pseudo random number generator 306 is to provide pseudo independent numbers which is near impossible to be achieved by regular functions. This allows the present embodiment to be able to encode independent variables to some encoded parameters. The role of the feedback loop unit 307 is to generate a greater number of outputs 303 than the given input parameters ($\Theta$) 301.

The NNCD design is totally hardware compatible and all of the relevant operations can be done by bitwise operations such as AND, OR, and XOR, which facilities incorporating one or more NNCD in an AI accelerator with little or no overhead. Alternatively, the NNCD can be implemented in the firmware to perform the decoding using a common computing processor like central processing units (CPU) or graphics processing units (GPU).

Figure 4:
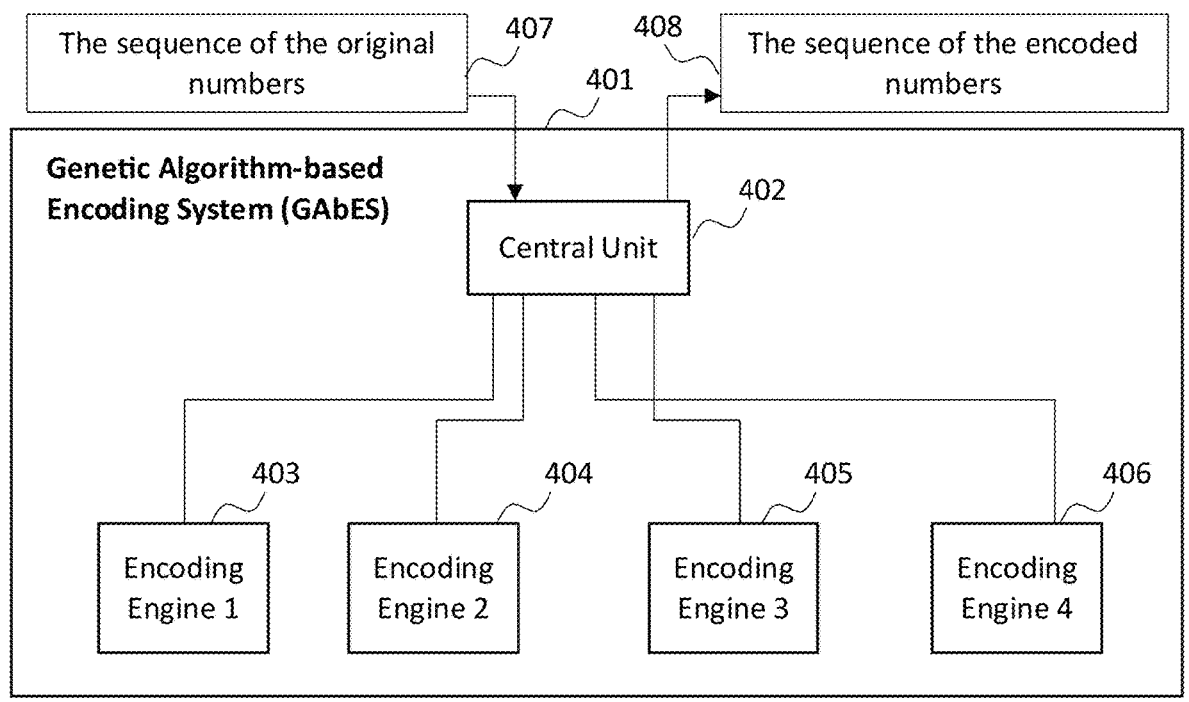
FIG. 4 depicts and exemplary block diagram of the disclosed genetic algorithm-based encoding system (GAbES)

The GAbES may comprises of several encoding engines. As an exemplary case, FIG. 4 depicts four encoding engines 403, 404, 405, and 406 and a central unit 402. In one exemplary system for the GAbES of the present embodiments, each encoding engine map four independent numbers in the range [0,1] into two encoded parameters and the central unit receives a sequence of numbers in the range [0,1] as the input, distributes the task of the encoding among the encoding engines, collects the encoded parameters from the encoding engines, and outputs the encoded parameters. In one example, when a sequence of N numbers 407 is received as the input of the GAbES 401, the central unit 402 divides it into batches of four numbers; and the encoding of the whole sequence is distributed among the encoding engines 403, 404, 405, and 406 by the central unit 402 such that each engine receives one of the batches at a time and send the encoded parameters back to the central unit. The central unit continues sending the batches to the encoding engines and receiving back the encoded parameters from them until all of the batches are encoded. The central unit may store the encoded parameters in the memory once received them from the encoding engines or forward them to the inference neural network as the sequence of the encoded numbers 408.

The task of each of the GAbES's engines is to solve the optimization problem described in equation (12) for every batch of given numbers ($C_1$, $C_2$, $C_3$, and $C_4$), separately, to find the optimum values of $\theta_1$ and $\theta_2$ minimizing the error of the NNCD.

$$\min_{\Theta=(\theta_1,\theta_2)} F(\Theta) = \sum_{i=1}^{4}(\hat{C}_i - C_i)^2 \quad (12)$$

in which $C_1$ refers to the actual number and $\hat{C}_i$ refers to the estimated one (output of the NNCD).

Assuming that in total there are N numbers to be encoded by the GAbES, then N/4 optimization problems must be solved. If we call each of such optimization problems a sub-problem (one task for each encoding engine), then there are N/4 sub-problems which are independent and can be solved in parallel. The posed optimization for each sub-problem is not an easy convex optimization model. In order to find the most accurate solution, a brute-force method may be used to solve the aforementioned optimization model. However, the computation is burdensome. In one example when $\Theta=(\theta_1, \theta_2)$ is 4 bytes ($\theta_1$ and $\theta_1$ are each 2 bytes) in order to encode each batch of four coefficients, $2^{32}$ plausible solutions must be examined. Considering that for each batch of four coefficients, a separate or independent optimization problem (sub-problem) has to be solved and the fact that the computational difficulty of the problem is O(N), which is proportional to the number of the input numbers, the computation time may be expensive. The traditional heuristic techniques and parallel processing may speedup the process, but it is still prohibitive for a deep neural network with a large number of coefficients.

In this discloser a novel approach taken to substantially reduce the encoding time and computation, by adapting a genetic algorithm (GA) to find a near optimum for each sub-problem of the disclosed embodiment. The GA is described by Bozorg-Haddad, O., Solgi, M, and Loaiciga, H. "*Meta-heuritsic and evolutionary algorithms for engineering optimization.*", Wiley, USA, 2017, pp 53-67. In the disclosed embodiment, the GA is adopted to minimize the error between the estimations and the original values which were encoded. In one example, the GA can save the computational effort of solving the sub optimization problems up to almost 99.997% percent in comparison to the brute force technique. In other words, our experiments demonstrated that for each sub-problem the GA examines less than $2^{17}$ plausible solutions instead of $2^{32}$ to provide a satisfactory solution.

Figure 5:
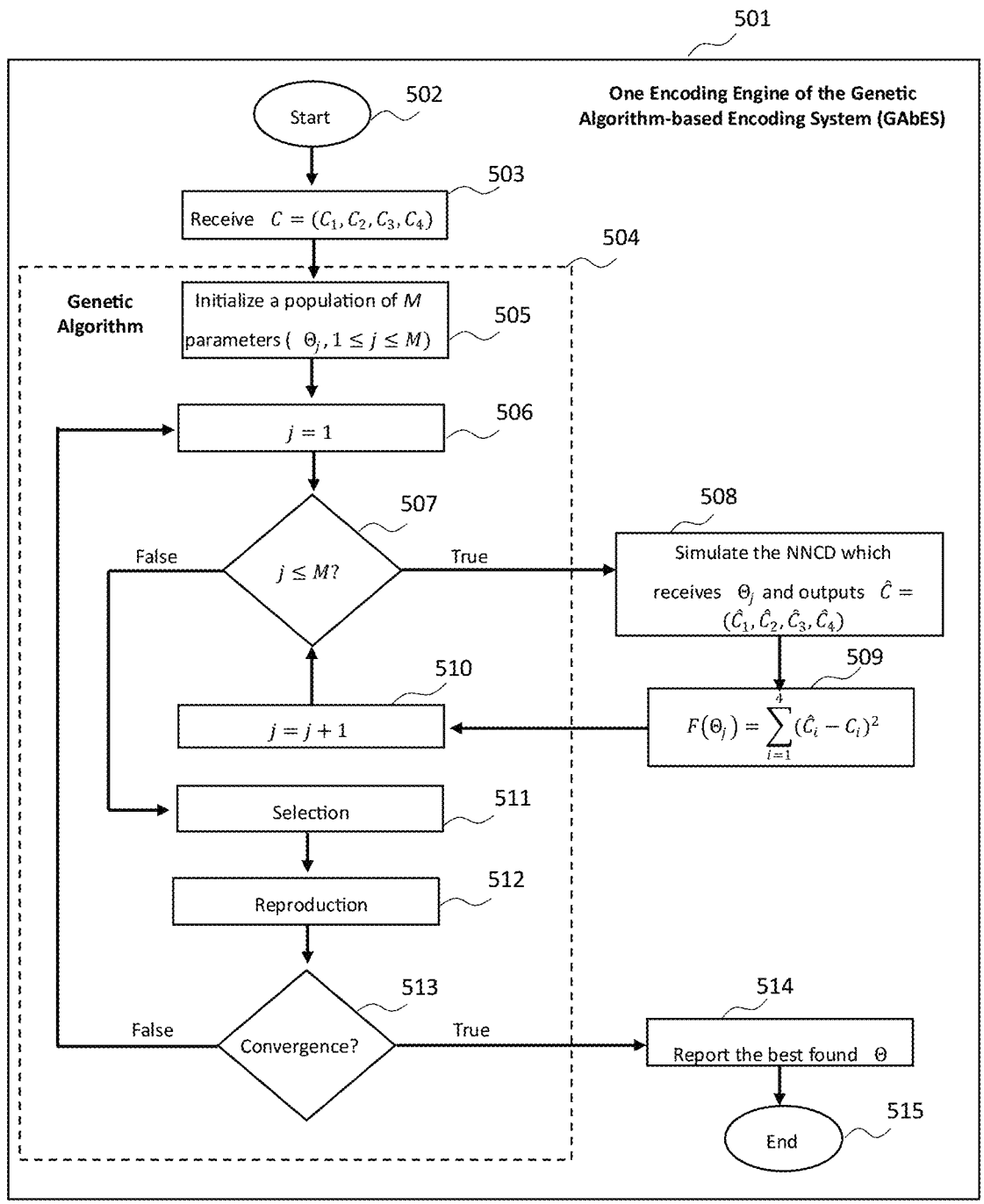
FIG. 5 illustrates the diagram of an exemplary encoding engine of the genetic algorithm-based encoding system (GAbES) of the disclosed embodiment.

Each of the GAbES's engines runs a GA 504 and the NNCD simulator 508 as depicted in FIG. 5. In one exemplary GAbES, the GA 504 starts first with generating a set of random solutions $(\Theta_1, \Theta_2, \ldots, \Theta_M)$, step 505, known as initial population by applying a discrete uniform distribution Unif$\{0,1\}$ on each bit of $\Theta_i=(b_1, b_2, \ldots, b_{32})$, $1\leq i\leq M$. Next, for each $\Theta_i$, $F(\Theta)$ is calculated by simulating the NNCD, and then a selection probability is assigned to each $\Theta_i$ using the following equation:

$$\prod(\Theta_i) = \frac{F(\Theta_i)}{\sum_{i=1}^{M} F(\Theta_i)}, 1 \leq i \leq M \tag{13}$$

In the process of selection, step 511, of the GA 504, P (P<M) parameters $\Theta_i$ are selected by replacement using a roulette wheel such that the solutions with higher probability (FI) has more chance to be selected to enter the crossover pool. Each solution in the crossover pool is labeled as effective or ineffective by a probability so called crossover probability $p_c$. During the process of reproduction, step 512, two solutions like $\Theta_i=(b_1, \ldots, b_{32})$ and $\Theta_j=(b_1', \ldots, b_{32}')$ are selected among the effective solutions in the crossover pool, randomly by uniform distribution and so called crossover operators are applied on them to generate two new solutions as below:

$$\Theta_1^{new}=(b_1, \ldots, b_c, b_{c+1}', \ldots, b_2) \tag{14}$$

$$\Theta_2^{new}=(b_1', \ldots, b_c', b_{c+1}, \ldots, b_{32}) \tag{15}$$

Next, some of the bits of the newly generated solutions are flipped by a mutation probability $p_m$. If $\Theta_i=(b_1, \ldots, b_{32})$ is a newly generated solution by crossover, the muted solution is generated as below:

$$\Theta^{new}=(b_1, \ldots, b_i', \ldots, b_{32}) \tag{16}$$

in which, $b_i'$=flipped bit. The procedure of selecting effective solutions and generating new solutions using crossover and mutations operators continue until M-P new solutions are generated.

The fitness functions of the newly generated solutions (new population) are calculated using simulating the NNCD, step 508, and the selection probabilities are updated. The process of selection, step 511, and reproduction, step 512, repeats until a termination criterion (i.e. total number of iterations) is met, step 513. The best final solution is reported as the best (optimum) solution, step 514. An elitism operation is also applied based on which the best solution (the solution with the minimum fitness function in each population) is carried to the next population with probability 1.

Figure 6:
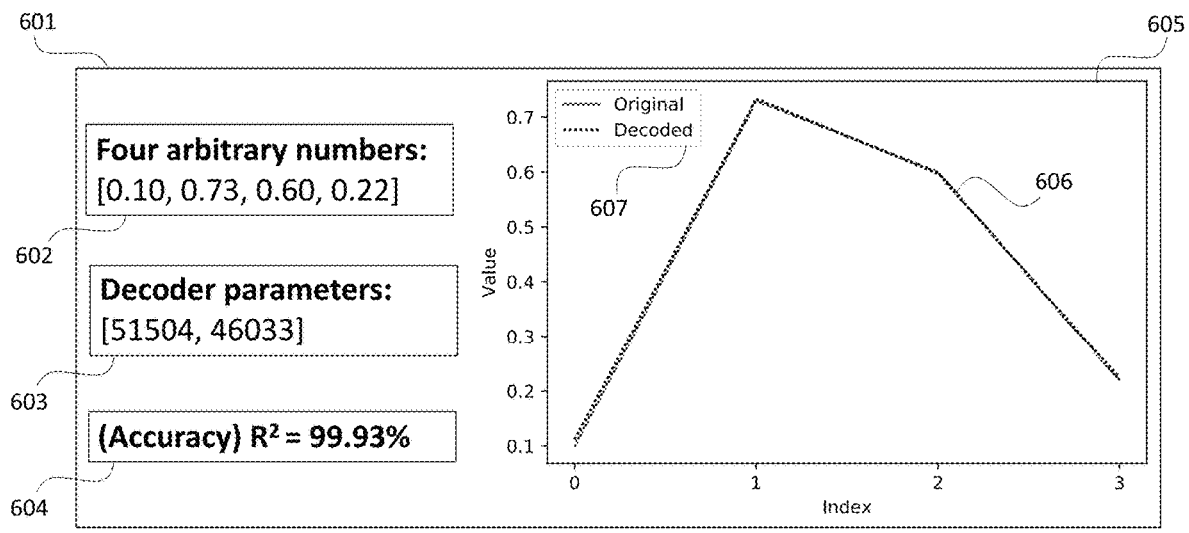
FIG. 6 illustrates the accuracy of an exemplary implementation of one encoding engine of the genetic algorithm-based encoding system (GAbES) of the disclosed embodiment on four arbitrary numbers.

FIG. 6 shows an example of the result of the application of one single encoding engine of the GAbES on a single batch of four arbitrary numbers 602. In this figure four numbers {0.10, 0.73, 0.60, 0.22} 602 are encoded using the embodiment. The exemplary encoded parameters are the binary equivalents of 51504 and 46033 603. As shown in FIG. 6 the accuracy of the fit (the coefficient of determination, $R^2$) is 99.93% 604. This Figure only shows the application of the disclosed embodiment for a batch of four numbers. If there are N numbers (coefficient) to be encoded, N/4 fitting problems are needed to be solved. The experiments done demonstrated that the accuracy of the fitness of the GAbES is normally higher than 99 percent.

Depending on the pseudo random number generator used in the GAbES, the present embodiment may be able to encode numbers in a specific range. In one example, the GAbES only encodes numbers between [0,1]. If the numbers are outside of this range, first, they have to be scaled in the range [0,1]. Therefore, before the encoding, groups of S (i.e. S be multiple of four) input numbers are scaled together as below.

$$C_i = \frac{X_i - X_{min}}{X_{max} - X_{min}}, i = 1, 2, \ldots, S \tag{17}$$

in which, $X_i$=the original value of coefficient i in the batch of S coefficients, $X_{min}$=the minimum value of the S coefficients, $X_{max}$=the maximum value of the S coefficients.

In one exemplary system for the present embodiment when the GAbES encodes every batch of four numbers to two encoded parameters. If each batch of four numbers are scaled separately, there is no advantage of using the presented embodiment because for every four numbers, two encoded parameters and two scaling parameters ($X_{max}$ and $X_{min}$) must be stored. Our experiments revealed that the encoder worked best when the scaling applied on middle size groups of numbers (i.e. 32 or 64 numbers). The aforementioned middle size scaling maintains accuracy as well as memory reduction capabilities. For example, the coefficients of each cell or each layer of a neural network can be scaled, separately, depending on the size of the network.

Figure 7:
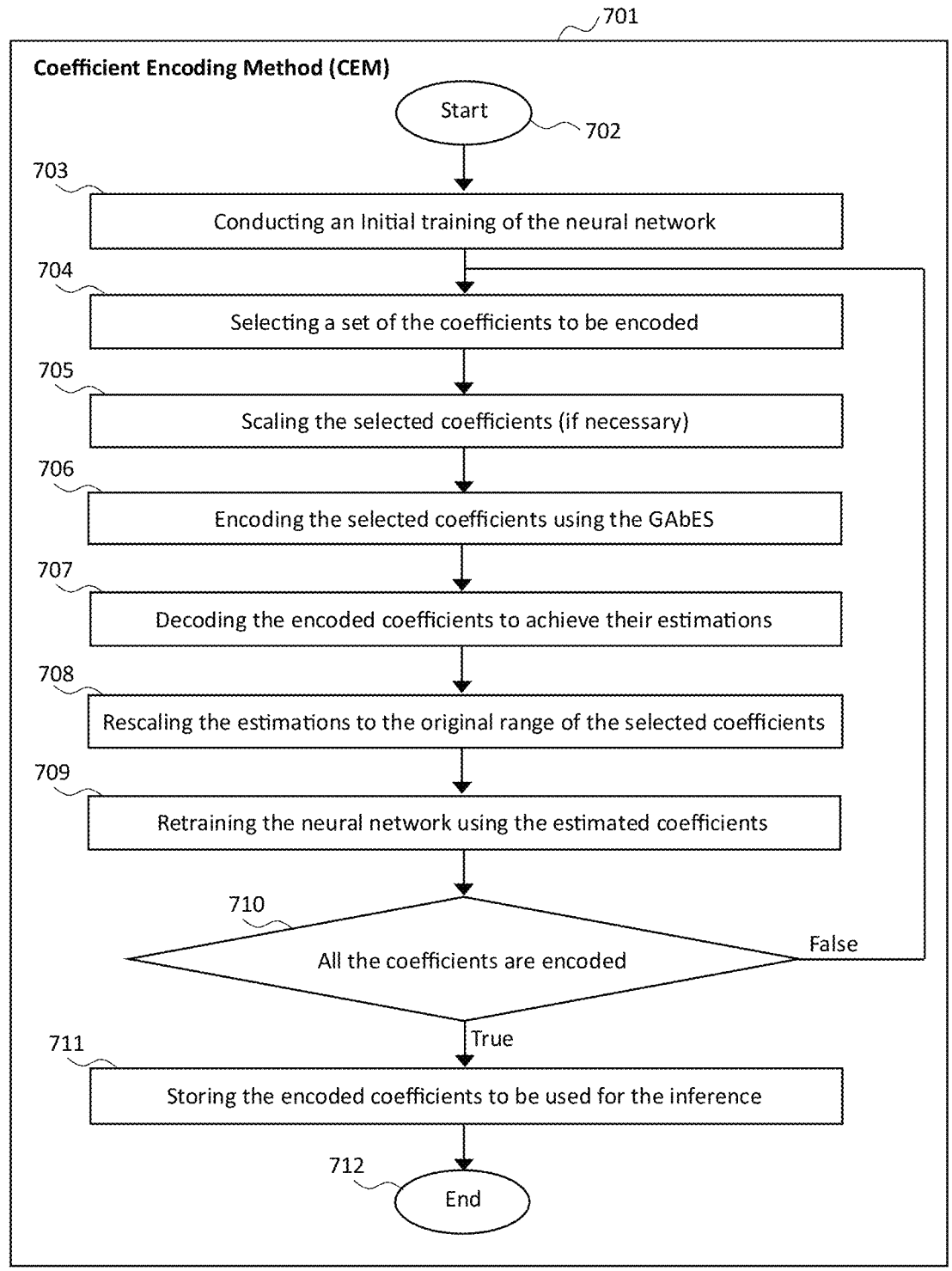
FIG. 7 illustrates the block diagram of the disclosed coefficient encoding method (CEM).

FIG. 7. depicts the flowchart of the coefficient encoding method (CEM) 103, 701 of the present embodiment. The CEM 701 comprises of an initial training of a neural network, step 703, selecting coefficients for partial encoding of the neural network, step 704, scaling the coefficients in the range acceptable by the GAbES (if necessary), step 705, encoding the coefficients, step 706, decoding the encoded coefficients to have the estimated coefficients, step 707, rescaling the estimations to the original range (if necessary) of the original coefficients, step 708, and retraining the rest of the network using the estimated coefficients to improve the accuracy, step 709. The algorithmic steps continue if all of the coefficients of the network are not encoded, step 710. Otherwise, the encoded coefficients are stored in the memory of a device or an artificial intelligence accelerator to be retrieved by the neural network coefficient decoder during run time of the inference neural network, step 711, and the algorithm stops, step 712.

Based on the CEM, the neural network coefficient encoding procedure is done in a successive manner alongside with retraining to improve the accuracy. In one example, first, the whole of the network is trained (using any training algorithm), then the coefficients of first layer of the network is encoded, and the rest of the network is retrained while the first layer's coefficients are fixed. The coefficients of the first layer at this step are output of the decoder. After the second layer is encoded, the first- and second-layers' coefficients are fixed and the rest of the network is retrained again. This procedure continues until the last layer is encoded. Obviously at this step, there is no trainable coefficients to be retrained. The same strategy can be extended to partially retraining each layer when some of the coefficients of that layer are non-trainable and the rest are retrained for example.

Figure 8:
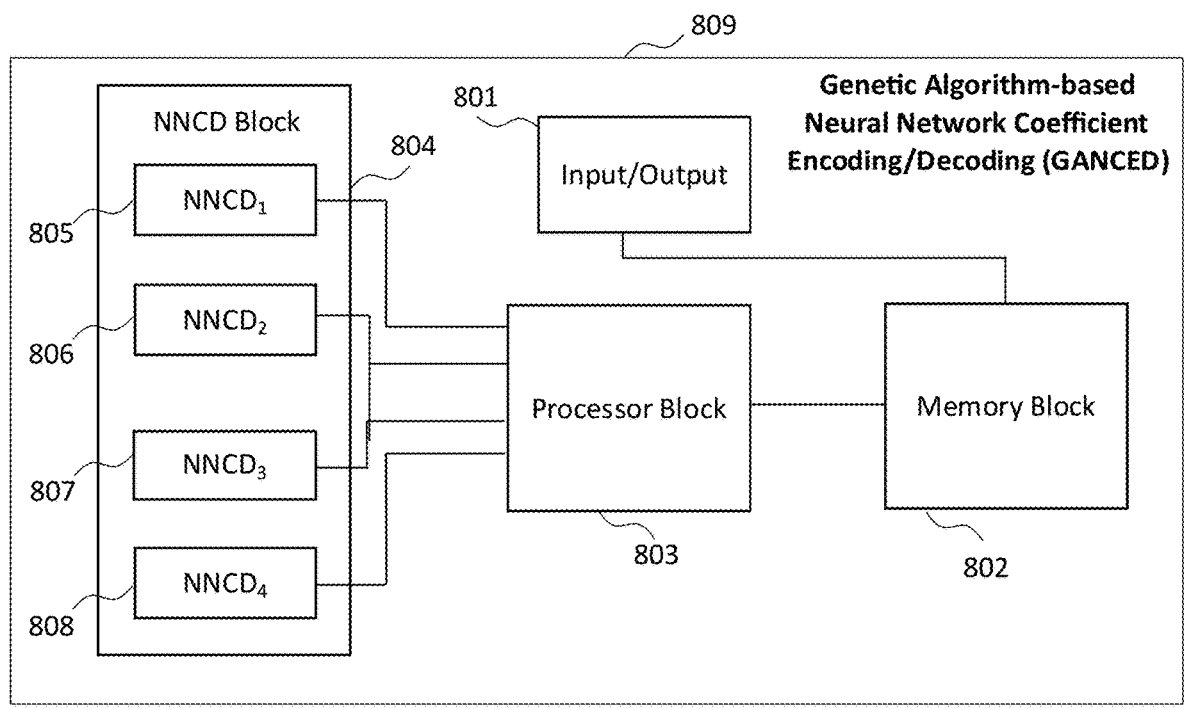
FIG. 8 depicts an exemplary block diagram of the disclosed genetic algorithm-based neural network coefficient encoding/decoding (GANCED) system.

The genetic algorithm-based neural network coefficient encoding/decoding (GANCED) 809 is a system that comprises of an input/output (I/O) unit 801, a memory block 802, a processor block 803, and a neural network coefficient decoder block (NNCD block) 804. The processor block 802 may be comprised of one or several central unit processors (CPUs), graphics processing units (GPUs), digital signal processors (DSPs), among other computing units, or any combination of them. The GANCED of this disclosure can be implemented and integrated in a system-on-chip (SoC) by itself, or embedded inside an artificial intelligence (AI) accelerator or a device. The GANCED can be used either for encoding of a neural network's coefficients during the training phase or for the decoding task during an inference neural network. Whether for encoding or decoding, the GANCED speeds up the process by applying actual NNCD circuits 805, 806, 807, and 808. FIG. 8. depicts an exemplary GANCED of the present embodiment where there are four NNCDs 805, 806, 807, and 808 embedded in the NNCD block 804. The number of the installed NNCDs in the NNCD block 804 can varies depending on the size and the scope of the circuit. For example, an embodiment with a processor block comprising of a multi-core CPU in addition to a GPU utilizing an NNCD block with several NNCDs in parallel may be suitable for very deep neural networks with hundreds of layers while a GANCED with a less powerful processor utilizing a single CPU and only one NNCD in the NNCD block may be sufficient for a small network with only one or two hidden layers. The capacity of the memory block 802 and its type also varies depending on the size of the neural network and the characteristics of the processors.

In one example where the GANCED conducts the encoding task of the coefficients of a neural network, the processor block conducts the initial training of a neural network, select the coefficients to be encoded, scale them in the appropriate range and run one or several genetic algorithms in parallel while passing the NNCD's parameters (produced by the GA) and receiving the encoded coefficients to and from the NNCD block and apply the result for calculating the fitness of the parameters. The processor block also conducts the rescaling the estimations and retraining of the neural network as described earlier in the CEM. In fact, the GANCED conducts the steps of the CEM while the processor block is responsible for all the tasks but simulating the NNCD. Instead, the actual NNCDs installed in the NNCD block are utilized. The number of GAs that can be run in parallel depends on the type and the capacity of the processors of the GANCED.

The GANCED is also able to conduct an inference neural network utilizing the NNCD block that allows decoding one or several batches of coefficients in parallel depending on the number of the NNCDs installed. In one example where the GANCED is used for inference neural network, the processor block calculates the inference neural network while retrieving the original coefficients by passing the encoded parameters to the NNCD block. The decoded coefficients received back by the processor are used for the inference neural network.

In one example, the disclosed embodiment was applied to run a long-short term memory (LSTM) neural network for keyword spotting task. The aforementioned LSTM network included 3 successive LSTM layers following a dense sigmoid layer. In total the network had 34,572 coefficients. The enclosed embodiment has been applied for all layers of the network. The enclosed embodiment reduced the memory usage (counting by bits) of the network by 70% while the accuracy dropped by only 0.12%. The remaining memory requirement includes the encoded coefficients (2-byte each) and scaling parameters (4-byte each). In another experiment, the embodiment applied for a neural network for image processing task. The network includes one dense layer of rectifier linear units (ReLU) and a dense layer of Softmax units which in total had 101,770 coefficients. The embodiments were only applied on the ReLU layer contributed in about 99 percent of the coefficients of the network. The memory usage of the encoded feedforward network was reduced by 69% without any loss of the accuracy. In both experiments the networks were retrained after each layer was encoded as explained earlier.

Unlike the decoding process, which is implemented during runtime, the encoding procedure is done offline, when there is access to multi-core processing units. Given one of the notable features of the present embodiment is that it is highly parallelizable. The CEM of the present embodiment fits well for offline parallel and distributed processing to further reduce the optimization and encoding time. On the other hand, the NNCD is fast and hardware friendly, which makes the real time decoding possible and inexpensive.

The disclosed embodiment is independent of the machine learning application and the neural network type; therefore, it can be applied to all types of neural networks such as, but not limited to, long-short term memory (LSTM), deep neural networks (DNN), convolutional neural networks (CNN), and recurrent neural networks (RNN) among others. Also, the present embodiment can be applied for reducing memory usage of other kind of machine learning models instead of the neural networks. Obviously, the disclosed embodiment also applicable to any model or machine learning that applies a neural network like reinforcement learning and federated learning among others. Furthermore, this disclosure can be implemented and integrated fully or partially in an SoC by itself, or embedded inside an artificial intelligence (AI) accelerator, or alternatively, be processed by a CPU, GPU, field-programmable gate array (FPGA), digital signal processor (DSP) or other computing units and devices. Similarly, the disclosed method and systems can be applied to or integrated in various types of memory storages such as but not limited to static random-access memory (SRAM), dynamic random access memory (DRAM), phase-change random access memory (PRAM), magnetoresistive random access memory (MRAM) or flash memory among others.

Although a few variations have been described in detail above, other modifications or additions are possible. In particular, further features and/or variations may be provided in addition to those set forth herein. Additionally, different disclosed embodiments may be combined with one another. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings or described in a particular order, this should not be understood as requiring that such operations be performed in the particular order shown or descried or in sequential order, or that all operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A system for predicting estimations of neural network coefficients from a shorter sequence of given input parameters, comprising:
    A number generator that generates one number for a given seed;
    A feedback loop unit which seeds said number generator;
    wherein, the feedback loop unit's output is a function of said given input parameters and the previous output of the number generator and where the feedback loop unit seeds the number generator repeatedly to generate a greater number of outputs than the given input parameters; and wherein the given input parameters and said function are determined by an evolutionary algorithm estimations.

2. The system of claim 1, wherein the number generator is a Mersenne Twister number generator.

3. The system of claim 1, wherein the outputs of the number generator and said input parameters are of any length in bit-count, either floating-point or integer binary numbers.

4. The system of claim 1, wherein the embodiment is implemented in hardware by its circuit realization or simulated on firmware applying central processing unit (CPU), graphics processing unit (GPU), digital signal processor (DSP) or field-programmable gate array (FPGA) circuit among other computing units, or a combination of them.

5. A method for neural network coefficient encoding to reduce the memory requirements of neural networks, comprising:
    training of a given neural network;
    selecting a set of optimized coefficients of the trained neural network;
    scaling the selected coefficients to a specific range;
    encoding the selected coefficients of the trained neural network into a shorter length sequence of parameters called encoded coefficients using an evolutionary algorithm;
    simulating a neural network coefficient decoder to predict estimations of the optimized coefficients, where the neural network coefficient decoder comprises of a number generator and a feedback loop unit where the feedback loop unit's output is a function of the encoded coefficients received by the decoder and the previous output of the number generator and where the feedback loop unit seeds the number generator repeatedly to generate a greater number of outputs than the given encoded coefficients;
    rescaling the estimations of the encoded coefficients;
    retraining the neural network after a portion of the neural network's coefficients is encoded where the previously encoded coefficients are considered non-trainable equal to their estimations;
    checking if there is any coefficients remained to be encoded; and
    storing the encoded parameters in a memory;
        wherein after the initial training of the given neural network, the optimized coefficients are scaled and partially encoded for one or more layers of the neural network; and wherein the encoded coefficients are the solutions of a set of optimization models that minimize a measure of the error between the estimated coefficients and the optimized coefficients, and wherein during the encoding process the simulator of the decoder is applied by the evolutionary algorithm in order to find a set of encoded coefficients that minimizes said error between the scaled optimized coefficients and the outputs of the decoder whose input is the encoded coefficients, and wherein the estimations are rescaled to the original range of the optimized coefficients; and wherein the retraining procedure is applied to minimize the loss of the accuracy of the inference neural network due to the error of the encoding; and wherein successive encoding and retraining are conducted until all of the coefficients of the neural network are encoded; and wherein the encoded coefficients are stored in the memory of a device or an artificial intelligence accelerator to be retrieved by the neural network coefficient decoder during run time of the inference neural network.

6. The method of claim 5, wherein the encoding further comprises of several encoders applied in parallel, each of which maps a batch of independent coefficients of a trained neural network into some encoded coefficients.

7. The method of claim 5, wherein the optimized coefficients, their estimations, and the encoded coefficients are of any length in bit-count, either floating-point or integer binary numbers.

8. The method of claim 5, wherein the number generator is a Mersenne Twister number generator seeded by the feedback loop unit whose output is a function of the encoded coefficients received by the decoder and the previous output of the Mersenne Twister number generator.

9. The method of claim 5, wherein the encoding and decoding are applicable for any kind of neural network regardless of its architecture including long-short term memory (LSTM), deep neural networks (DNN), convolutional neural networks (CNN), and recurrent neural networks (RNN).

10. The method of claim 5, wherein the evolutionary algorithm is a genetic algorithm.

11. The method of claim 5, wherein the initial training of the neural network is done by any optimizer including a stochastic gradient descent (SGD) or Adam optimizer.

12. The method of claim 5, wherein the embodiment is implemented in software or firmware to be run on a central processing unit (CPU), graphics processing unit (GPU), digital signal processor (DSP) or field-programmable gate array (FPGA) circuit among other computing units, or a combination of them.

* * * * *